Dec. 17, 1940.                C. EDINGER                2,225,041
                        TIRE GROOVING APPARATUS
             Filed June 17, 1939              2 Sheets-Sheet 1
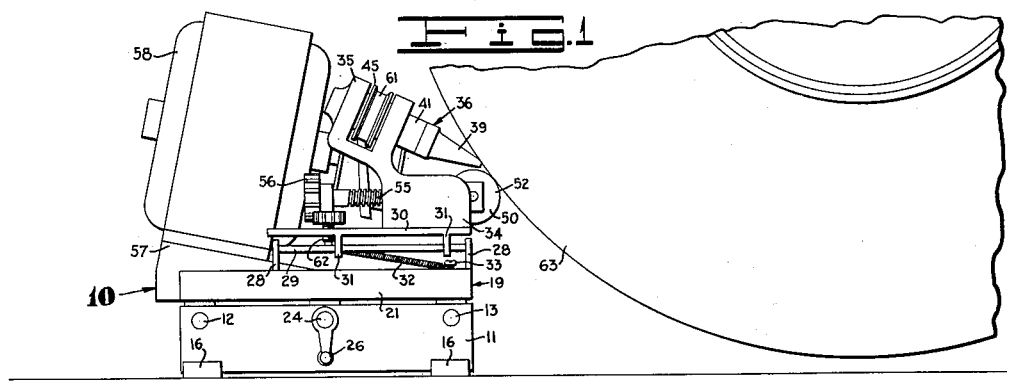
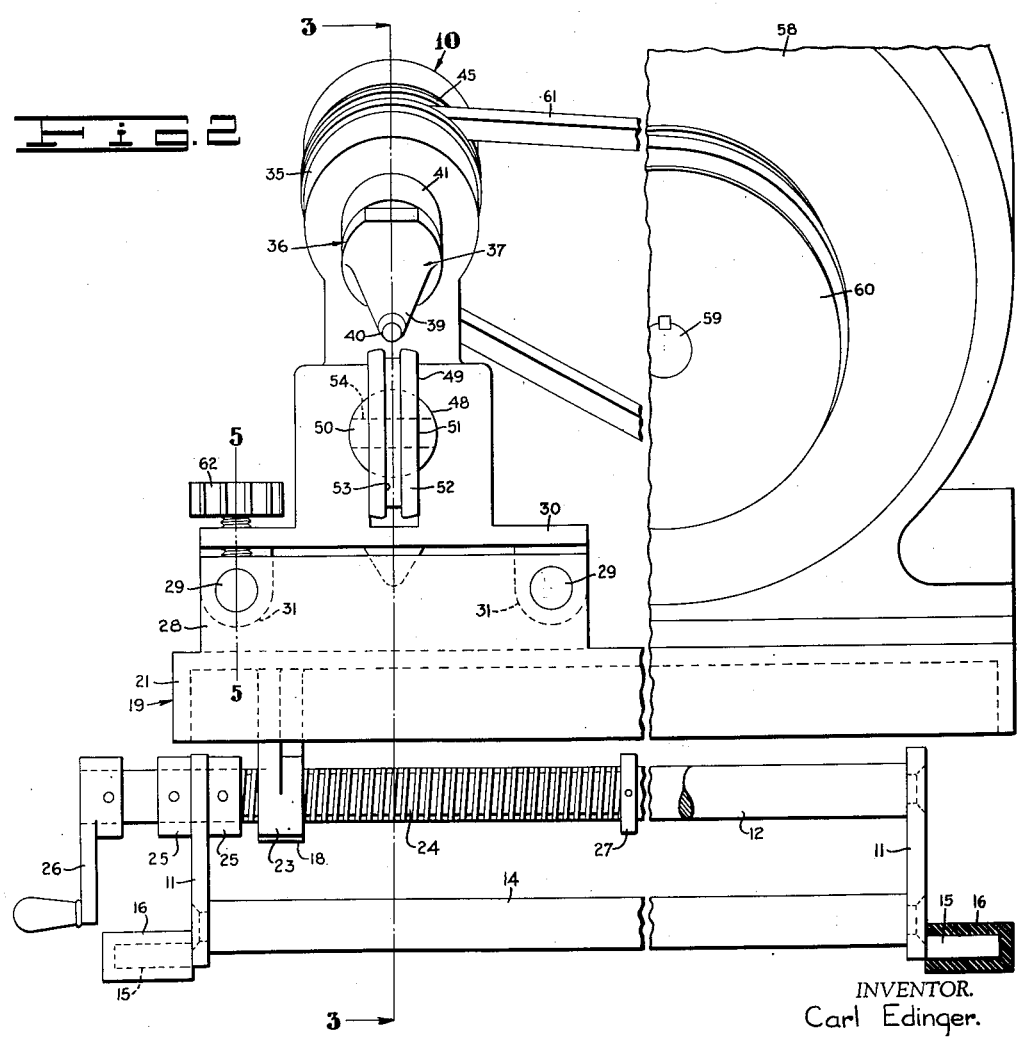
INVENTOR.
Carl Edinger.
BY
ATTORNEY.

Dec. 17, 1940.  C. EDINGER  2,225,041
TIRE GROOVING APPARATUS
Filed June 17, 1939  2 Sheets-Sheet 2
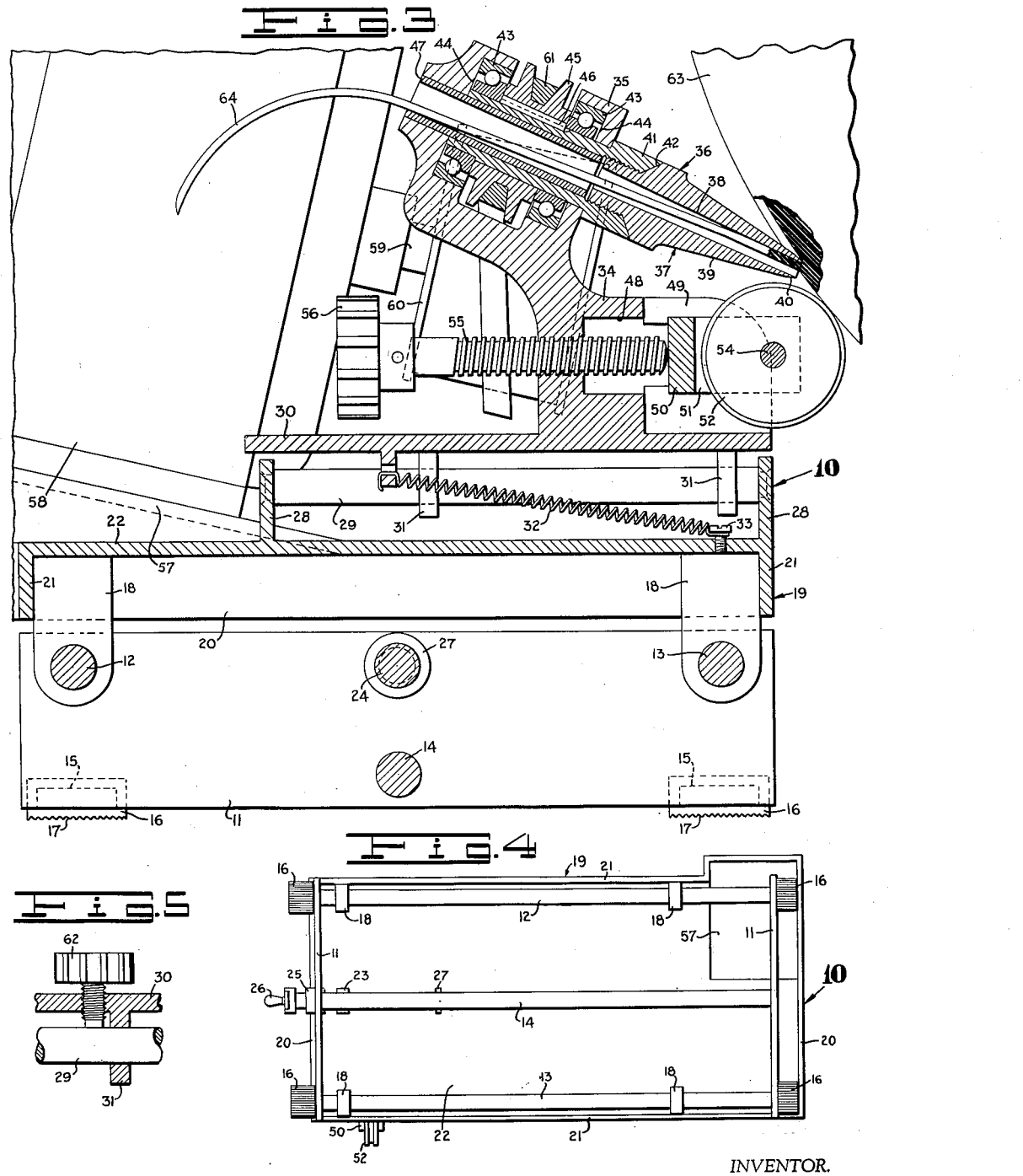
INVENTOR.
Carl Edinger.
BY
ATTORNEY.

Patented Dec. 17, 1940

2,225,041

UNITED STATES PATENT OFFICE 2,225,041

TIRE GROOVING APPARATUS

Carl Edinger, Inglewood, Calif.

Application June 17, 1939, Serial No. 279,700

6 Claims. (Cl. 82—4)

This invention relates to apparatus for cutting grooves in tires.

The general object of the invention is to provide a tire grooving apparatus which will enable a vehicle to be elevated and the apparatus manipulated so that a tire may be regrooved without being removed from the vehicle.

A more specific object of the invention is to provide an accurate, quick acting, portable, grooving apparatus which is made of few parts and which is positive in its operation.

An additional object of the invention is to provide a novel cutting member for use in a tire grooving machine.

An additional object of the invention is to provide a novel drive for a tire grooving member.

Another object of the invention is to provide a novel mounting for a tire grooving member.

Other objects and the advantages of this invention will be apparent from the following description taken in connection with the accompanying drawings, wherein:

Fig. 1 is a fragmentary side elevation showing a portion of an automobile tire and my apparatus in position to cut a groove in the tire;

Fig. 2 is a front elevation with parts broken away showing my tire grooving apparatus;

Fig. 3 is a fragmentary sectional view showing the cutting member and associated parts;

Fig. 4 is a bottom plan view showing the supporting member and my tire grooving apparatus; and Fig. 5 is a fragmentary sectional detail taken on line 5—5, Fig. 2.

Referring to the drawings by reference characters I have shown my invention as embodied in a tire grooving machine which is indicated generally at 10. In the following description I refer to the apparatus disclosed as adapted for use in grooving the tires of vehicles, but it will be understood that the apparatus may be used with equal facility in cutting or grooving other soft or semi-hard material such as wood, leather, plastics, meat, etc.

In the accompanying drawings the apparatus is shown as mounted on a base which includes side plates 11. These side plates are connected by transverse rods 12 and 13 located near the upper portions of the plates and by a rod 14 located near the bottom of the plate. Each side plate includes spaced protruding legs 15 which are preferably covered with rubber as at 16 with the rubber preferably corrugated as at 17 to prevent slipping.

Slidably mounted on the rods 12 and 13 I show suitable supports 18. These supports 18 engage a table 19 which includes sides 20, ends 21 and a top 22. The table includes a depending threaded member 23, the threads of which engage a screw 24 which is rotatably supported in one end plate 11 and having on each side thereof collars 25 and is adapted to be rotated by a crank handle 26. The construction is such that when the handle 26 is rotated the carriage 22 is reciprocated. A collar 27 on the screw limits the movement of the carriage. The carriage includes upwardly extending brackets 28 which support parallel spaced rods 29.

A cutter base 30 includes brackets 31 which slidably engage the rods 29 thus allowing the cutter base to be reciprocated towards and from the work. A spring 32 engaging a screw 33 on the carriage at one end and having its other end secured in an apertured bracket on the cutter base 30 serves to urge the cutter base towards the work. The cutter base 30 includes an upwardly extending support 34 having an integral bearing block 35 thereon.

The operating tool or cutter is indicated at 36 and includes a cylindrical body 37 having a tapered axial bore 38 which extends from the rear end thereof to the forward end. The exterior of the cutter has the forward end tapered as at 39 so that the extreme end forms a knife edge 40 which performs the cutting operation. The rear end of the tool is threaded and fits within a hollow shaft 41. The shaft 41 and tool 37 preferably have a bevelled engaging portion 42 where they meet.

The shaft 41 has the inner elements of a pair of ball races 43 mounted thereon, while the outer elements of the ball races are mounted in recesses 44 in the bearing block. The ball races are spaced apart so that a drive member shown as a pulley 45 may be arranged between them. The pulley 45 is arranged on the shaft 41 being held thereon by a key 46.

Mounted within the shaft 41 I arrange a sleeve 47 which is pressed into the bearing block and which extends within the shaft 41.

The support 34 includes a cylindrical recess 48 which is intersected by a slot 49 as best shown in Fig. 2. Within the recess 48 I mount a rod 50 the outer end of which is bifurcated as at 51 to receive a roller 52 having a central groove 53 therearound. The roller 52 is mounted on a shaft 54 rotatably supported by the rod 50 and the roller is so arranged (see Figs. 1 and 3) that it engages a tire adjacent to the tool 37. The rear of the rod 50 is engaged by a screw 55 having a hand wheel 56 thereon and threaded in the support 34 so that the position of the screw determines the rear limit of movement of the roller 52.

The table 19 includes an inclined portion 57 which supports a motor 58, the latter including a shaft 59 on which a pulley 60 is mounted. The pulley 60 drives a belt 61 which passes over the pulley 45 previously described so that when the motor is operated the pulley 45 drives the tool 37.

A screw 62 is mounted on the cutter base 30 and extends through this base and engages one of the rods 29. By tightening the screw 62 the cutter base will be held in retracted position.

In use the apparatus is arranged adjacent to a tire 63 and the cutter 37 is brought against the tire after which the hand wheel 56 is rotated so that the screw 55 shifts the roller 52 to the desired position so that the correct depth of cut is secured. The motor is then started and the cutting tool revolved. The tire 63 is then rotated about its axis and a strip of material 64 is cut from the tire thus forming a groove. The material 64 passes through the cutter bore and through the sleeve 47.

The resiliency of the spring 32 causes the cutter base to be moved rearwardly whenever a bump on a tire engages the wheel 49 and this way there is no likelihood of the tire being gouged. The taper in the bore of the cutting tool 37 prevents clogging in the tool.

After a groove is cut the cutter base is moved rearwardly and the screw 62 tightened to hold the cutter base in this position so that it may be moved for a fresh cut. The relation of the cutter with respect to the face of the tire may be fixed by rotating the handle 26 and thus moving the cutter base across the face of the tire.

From the foregoing description it will be apparent that I have invented a novel tire grooving apparatus which can be economically manufactured and which is highly efficient for its intended purpose.

Having thus described my invention, I claim:

1. In a tire grooving apparatus, a support, a cutter base mounted to reciprocate on said support, a hollow shaft rotatably mounted on said cutter base, means to drive said shaft, a tool mounted on said shaft, said tool having a tapered bore therethrough, said tool having a similarly tapered exterior surface to provide a forward cutting edge, and a pair of wheels shiftably mounted on said support and movable relative to said cutting tool, said cutting tool bore being disposed between said wheels.

2. In a tire grooving apparatus, a base, a table mounted to reciprocate on said base, a cutter base mounted to reciprocate on said first mentioned base, resilient means to urge said cutter base in one direction, a support on said cutter base, a hollow shaft rotatably mounted on said support, means to drive said shaft, said shaft including a threaded portion, a tool engaging said threaded portion, said tool having a tapered bore therethrough, said tool having a tapered exterior surface to provide a forward cutting edge, and a pair of wheels shiftably mounted on said support and movable relative to said cutting tool, said cutting tool bore being disposed above and between said wheels.

3. In a tire grooving apparatus, a base, a table mounted to reciprocate on said base, a cutter base mounted to reciprocate on said first mentioned base, a support on said cutter base, a hollow shaft rotatably mounted on said support, means to drive said shaft, said shaft including a threaded portion, a tool engaging said threaded portion, said tool having a tapered bore therethrough, said tool having a tapered exterior surface to provide a forward cutting edge, and guide means shiftably mounted on said rod support and movable relative to said cutting tool, said cutting tool bore being disposed above said guide means.

4. In a tire grooving apparatus, a base, a table mounted to reciprocate on said base, a cutter base mounted to reciprocate on said first mentioned base, resilient means to urge said cutter base in one direction, a support on said cutter base, said support having a bearing block thereon, a hollow shaft rotatably mounted in said bearing block, a pulley keyed on said shaft, said shaft including a threaded portion, a tool engaging said threaded portion, said tool having a tapered bore therethrough, said tool having a tapered exterior surface to provide a forward cutting edge, a pair of wheels shiftably mounted on said support and movable relative to said cutting rod, said cutting tool bore being disposed above and between said wheels.

5. In a tire grooving apparatus, a base, a table mounted to reciprocate on said base, means for reciprocating the table on the base, a plurality of rods on the base, a cutter base mounted to reciprocate on said rods, resilient means to urge said cutter base in one direction, a support on said cutter base, said support having a bearing block thereon, a hollow shaft rotatably mounted in said bearing block, a pulley on said shaft, a tool on said shaft, said tool having a tapered bore therethrough, said tool having a tapered exterior surface to provide a forward cutting edge, a sleeve in said shaft, a rod slidably mounted on said support adjacent to said cutter, wheels on said rod, and means to shift said rod.

6. In a tire grooving apparatus, a base, a table mounted to reciprocate on said base, hand operated means for reciprocating the table on the base, a plurality of rods on the base, a cutter base mounted to reciprocate on said rods in a direction at right angles to the path of said table, resilient means to urge said cutter base in one direction, clamp means to hold the cutter base against the action of said resilient means, a support on said cutter base, said support having a bearing block thereon, a hollow shaft rotatably mounted in said bearing block, a pulley keyed on said shaft, said shaft including a threaded portion, a tool engaging said threaded portion, said tool having a tapered bore therethrough, said tool having a tapered exterior surface to provide a forward cutting edge, a sleeve in said shaft, a rod slidably mounted on said support, a pair of wheels rotatably mounted on said last mentioned rod, a threaded member mounted on said support and engaging said last mentioned rod, the axis of said cutting tool bore being disposed in a plane between said wheels.

CARL EDINGER.